(12) United States Patent
Baratakke et al.

(10) Patent No.: US 7,742,419 B2
(45) Date of Patent: *Jun. 22, 2010

(54) METHOD, SYSTEM AND ARTICLE FOR IMPROVED TCP PERFORMANCE DURING PACKET REORDERING

(75) Inventors: Kavitha Vittal Murthy Baratakke, Austin, TX (US); Vinit Jain, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/101,765

(22) Filed: Apr. 11, 2008

(65) Prior Publication Data

US 2008/0186863 A1 Aug. 7, 2008

Related U.S. Application Data

(63) Continuation of application No. 10/640,818, filed on Aug. 14, 2003, now Pat. No. 7,385,923.

(51) Int. Cl.
*H04L 1/00* (2006.01)

(52) U.S. Cl. .................................. 370/235; 709/235

(58) Field of Classification Search ......... 370/229–235; 709/223–226, 234–235
See application file for complete search history.

(56) References Cited

U.S. PATENT DOCUMENTS 7,046,631 B1 * 5/2006 Giroux et al. ............... 370/234

FOREIGN PATENT DOCUMENTS

| JP | 9200134279 A | 5/2000 |
| JP | 92002534907 T | 10/2002 |

* cited by examiner

*Primary Examiner*—Ricky Ngo
*Assistant Examiner*—Pao Sinkantarakorn
(74) *Attorney, Agent, or Firm*—Dillon & Yudell LLP

(57) ABSTRACT

TCP congestion avoidance is implemented upon retransmission of a packet and is reverted back to the original congestion state upon receipt of an early acknowledgement (ACK), indicating reordering of packets, thereby eliminating a needless restriction on TCP bandwidth. Upon receiving an ACK to a retransmitted packet, it is determined if the ACK resulted from receipt of the original reordered packet or the retransmitted packet, based on the arrival time of the ACK at the sender. If the round-trip-time (RTT) for the retransmitted packet is much lower than the average or current calculated RTT for the network link between sender and receiver, then the retransmission occurred as a result of a reordering event, and the congestion window is restored back to its value prior to the retransmission, thereby permitting the network link to continue operating at its original increased throughput.

22 Claims, 6 Drawing Sheets

METHOD, SYSTEM AND ARTICLE FOR IMPROVED TCP PERFORMANCE DURING PACKET REORDERING

The present application is a continuation of U.S. patent application Ser. No. 10/640,818, filed on Aug. 14, 2003 now U.S. Pat. No. 7,385,923, entitled "Method, System and Article for Improved TCP Performance during Packet Reordering". Applicants claim benefit of priority under 35 U.S.C. § 120 to U.S. patent application Ser. No. 10/640,818, which is incorporated by reference herein in its entirety and for all purposes.

TECHNICAL FIELD

The present invention relates generally to data transfers in data processing system networks and in particular to transfer of data blocks over the Internet or similar networks. More particularly, the present invention relates to improving congestion control in a TCP network during packet reordering.

BACKGROUND

The Internet has become an important conduit for transmission and distribution of data (text, code, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol in Internet and Intranet technology, enabling broad heterogeneity between clients, servers, and the communications systems coupling them. Internet Protocol (IP) is the network layer protocol and Transmission Control Protocol (TCP) is the transport layer protocol. At the network level, IP provides a "datagram" delivery service. By contrast, TCP builds a connection oriented transport level service over the datagram service to provide guaranteed, sequential delivery of a byte stream between two IP hosts. Application data sent to TCP is broken into segments before being sent to IP. Segments are sequenced by segment numbers.

Reliability in data transmission can be compromised by three events: data corruption, data loss, and reordering of data. Data loss is managed by a time-out mechanism. TCP maintains a timer (retransmission timer) to measure the delay in receiving an acknowledgment (ACK) from the receiver for a transmitted segment. When an ACK does not arrive within an estimated time interval, the corresponding segment is assumed to be lost and is retransmitted. TCP manages reordering of data or out-of-order arrival of its segments transmitted as IP datagrams by maintaining a reassembly queue that queues incoming packets until they are rearranged in-sequence. Only when data in this queue gets in sequence is it moved to the user's receive buffer where it can be seen by the user. TCP manages data corruption by performing a checksum on segments as they arrive at the receiver. On checksum, the TCP sender computes the checksum on the packet data and puts this 2-byte value on the TCP header. The checksum algorithm is a 16-bit one's complement of a one's complement sum of all 16-bit words in the TCP header and data. The receiver computes the checksum on the received data (excluding the 2-byte checksum field in the TCP header) and verifies that it matches the checksum value in the header. The checksum field also includes a 12-byte pseudo header that contains information from IP header (including a 4-byte "src ip" address, 4-byte "dest ip" address, 2-byte payload length, 1-byte protocol field).

The TCP protocol was initially designed to work in networks with low link error rates, i.e., all segment losses were mostly due to network congestion. As a result, the sender decreases its transmission rate each time a segment loss is detected. However, when a reordered packet is erroneously determined to be a packet lost in network congestion, the associated decrease in transmission rate from congestion control causes unnecessary throughput degradation.

Packet reordering is a common occurrence in TCP networks given the prevalence of parallel links and other causes of packet reordering. For instance, on Ether-channel where a number of real adapters are aggregated to form a logical adapter, packet reordering is commonly caused when packets are sent in parallel over these multiple adapters. In TCP, any data packets following the one that has been lost or reordered are queued at the receiver until the missing packet arrives. The receiver then acknowledges all the packets together. While the receiver is waiting for the lost packet to be retransmitted, no more data is sent. However, due to the reordering of packets, TCP sessions will automatically implement Fast Retransmit and Recovery because TCP will wrongly infer that network congestion has caused a packet loss. When reordering inadvertently triggers Fast Retransmit and Recovery or notification through Selective Acknowledgment Option (SACK), the congestion window is cut in half; and when a time-out occurs, the congestion window is set to one segment size, forcing slow start. Because these mechanisms automatically reduce the congestion window, such packet reordering inadvertently causes drastic degradation in network performance. It would be desirable to avoid such unnecessary throughput degradation due to packet reordering.

SUMMARY OF THE INVENTION

In accordance with the present invention, improved methods, systems and articles of manufacture for improving transport layer performance following packet reordering in a network are disclosed. In one preferred method of the present invention, where a network connection between a sender and a receiver operates in a congestion state, the method includes receiving a predetermined threshold number of first acknowledgements requesting a data packet be transmitted over the network connection operating in a first congestion state; in response to receiving the predetermined threshold number of first acknowledgements, transmitting the requested data packet over the network connection from the sender to the receiver; receiving a second acknowledgement indicating that the requested data packet has been received by the receiver; calculating the difference between the time that the second acknowledgement was received and the time that the requested data packet was transmitted; setting the congestion state of the network connection to the first congestion state, if the difference is less than a threshold round-trip-time, wherein the threshold round-trip-time is a minimum round-trip-time for a data packet over the network connection between the sender and the receiver; and setting the congestion state of the network connection to a second congestion state, if the difference is greater than the threshold round-trip-time, wherein the second congestion state is less than the first congestion state.

DETAILED DESCRIPTION OF PREFERRED EMBODIMENTS

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Figure 1:
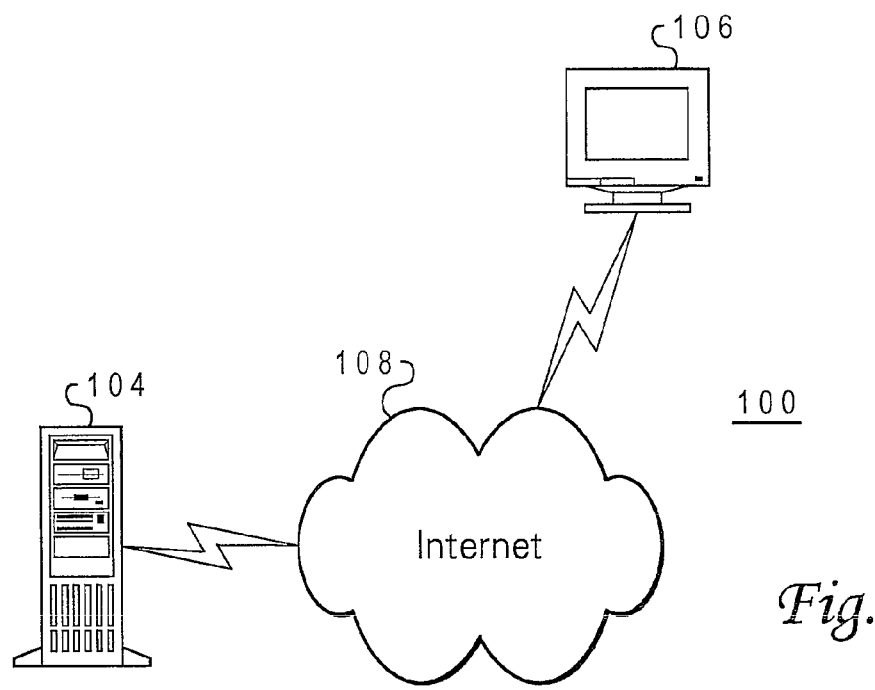
FIG. 1 a data processing system network in which a preferred embodiment of the present invention may be implemented is depicted.

With reference now to the figures, and in particular with reference to FIG. 1, a data processing system network in which a preferred embodiment of the present invention may be implemented is depicted. Data processing system network 102 includes at least one server system 104 coupled to at least one client system 106 via at least one network such as the Internet 108. Data transfers between the server system 104 and client system 106 conform to the TCP/IP specification, as well as File Transfer Protocol (FTP), HyperText Transfer Protocol (HTTP), or some similar communications protocol. As will be appreciated, while only a single server system 104 and single client system 106 are shown, data processing system network 102 may include any number of server and client systems (not shown) interconnected by one or more connections and networks, including Internet 108.

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP (Transmission Control Protocol/Internet Protocol) protocol suite. The TCP/IP protocol suite allows a variety of different types of computers, running different operating systems, to communicate with each other. TCP/IP forms the basis for the worldwide Internet, a wide area network of more than one million computers that literally spans the globe. There are many other network protocol suites in addition to the TCP/IP suite, including IPX/SPX (Internet Packet Exchange/Sequenced Packet Exchange), and NetBios. Although originally developed by independent research groups, most network protocols are open (non-proprietary) standards, many of which are published as a series of numerically-ordered RFC (Request for Comment) papers. For example the IP protocol is RFC 791. The RFC papers are readily available on the Internet or at a various libraries. Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention may also be applied to various other network protocols as well.

Flow control is the procedure of handling the mismatch in processing and buffering capacities between a receiver and a transmitter to best utilize the bandwidth provided by the transmission medium. TCP flow control mechanisms operate exclusively at the end stations to limit the rate at which TCP endpoints emit data. However, TCP lacks explicit data rate control. The basic flow control mechanism is a "sliding window", superimposed on a range of bytes beyond the last explicitly acknowledged byte. The sliding window limits the maximum number of sequential bytes between the byte most recently sent from the server to the earliest byte for which a receipt acknowledgment has not yet been received from the client. This sliding operation limits the amount of unacknowledged transmissible data that a TCP endpoint can emit. A receiving host, during the connection setup phase, informs the transmitting host its buffer capacity relating to the "maximum" number of packets that can be outstanding (unacknowledged) at any given time. This is the receiver or sliding window size, rwnd. The transmitter maintains a transmission window whose current size, wnd, is an estimate of how many packets can be pumped into the network without waiting for an acknowledgment (ACK). An upper bound on wnd is rwnd.

A variety of algorithms automatically re-send packets and slowly restart data transmission when the sliding window limit is exceeded. Thus, if the link between the server and client is shut down in the middle of transmission of a data collection, the server will stop sending packets within one sliding window of the last packet acknowledged by the client. This use of a sliding window inherently limits the bandwidth of a data transfer through the network.

The Slow Start (SS) algorithm in TCP sets the window size to zero and measures unknown capacity of the transmission route when starting or restarting connections. The bandwidth-delay product of the data path is a rough approximation of the capacity of the transmission route. In every iteration of the SS algorithm, the window size is doubled reaching the estimate of delay-bandwidth product.

The TCP Congestion Avoidance algorithm reacts to congestion in the network by reducing the transmission rate in a controlled manner. Congestion is a condition of severe delay caused by an overload of datagrams at the switching points (e.g., at gateways or routers) resulting in dropping of packets. A sender reacts to delay and packet loss by retransmitting the affected packets. This adds to congestion, which can then grow quickly, resulting in what is now known as a congestion collapse. Congestion Avoidance begins when an original ACK is lost as detected by a time-out or when a receiver transmits a duplicate acknowledgment (DACK) in response to receiving an out-of-order packet. Upon this occurrence, the transmission route capacity estimate computed in the previous iteration of the Congestion Avoidance algorithm is stored in the variable ssthresh. This estimate is hence used as a threshold until slow start is performed and the transmission route capacity is re-measured later. Beyond a window size of ssthresh, a linear increase in window size is adopted. Another other variable cwnd is used to store a running estimate of the window size as governed by congestion. It can be seen that the transmission window is limited to the lesser of the congestion window and the sliding window (i.e., wnd=min(cwnd, rwnd)). Additionally, if congestion is indicated by a time-out, cwnd is set to one segment size—forcing slow start.

Another mechanism for enhanced TCP performance is the Fast Retransmission and Recovery (FRR) algorithm. When the number of DACKs received for a particular transmission reaches a threshold (typically 3), TCP retransmits the lost packet and the window is reduced by a factor of two instead of being closed to one. Upon detection of congestion through timeout (strong indication of congestion) or a DACK (weak indication of congestion), half of the current congestion window (cwnd) is stored in ssthresh to force congestion avoidance. This is the multiplicative decrease part of the congestion control algorithm. Further, in order to prevent a burst of packets from being transmitted when the retransmission is finally acknowledged, new packets are transmitted with each DACK while performing Congestion Avoidance. FRR fails when a contiguous number of packets exceeding the transmission window (wnd) or the last packet in a transmission is lost.

Figure 2:
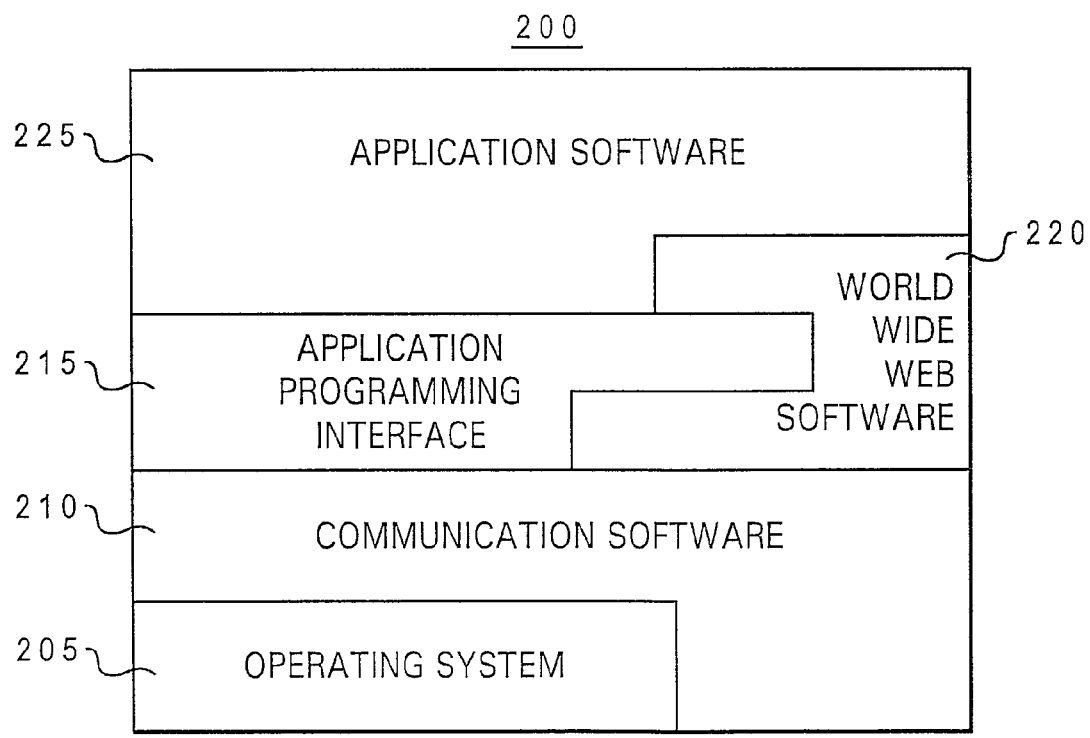
FIG. 2 is a depiction of a typical software architecture for a server-client system, as may be utilized in a preferred embodiment of the present invention.

FIG. 2 is a depiction of a typical software architecture for a server-client system, as may be utilized in a preferred embodiment of the present invention. Server 104 and client 106 are each architected with software architecture 200. At the lowest level, an operating system 205 is utilized to provide high-level functionality to the user and to other software. Such an operating system typically includes a BIOS (Basic Input Output System). Communication software 210 provides communications through an external port to a network such as the Internet via a physical communication link by either directly invoking operating system functionality or indirectly, bypassing the operating system to access the hardware for communications over the network. The application programming interface 215 allows the user of the system, be it an individual or a software routine, to invoke system capabilities using a standard consistent interface without concern for how the particular functionality is implemented. The Internet software 220 represents any one of several standard commercial packages available for equipping a computer with Internet functionality. The application software 225 represents any number of software applications designed to react to data through the communications port to provide the desired functionality the user seeks. Applications at this level may include those necessary to handle data, video, graphics, photos or text, which can be accessed by users of the Internet.

Figure 3:
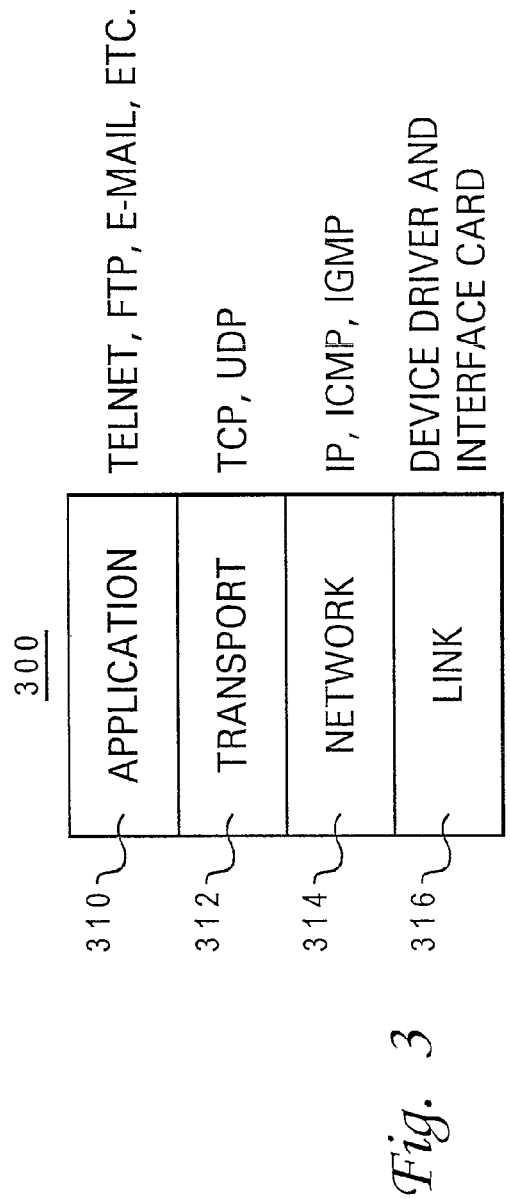
FIG. 3 shows an example of a 4-layer communications architecture utilizing TCP/IP.

As shown in FIG. 3, TCP/IP and similar protocols are utilized by a 4-layer communications architecture 300 for the network comprising an application layer 310, a transport layer 312 a network layer 314, and a link layer 316. Each layer is responsible for handling various communications tasks, as follows. The link layer 316 (also referred to as the data-link layer or the network interface layer) normally includes the device driver in the operating system and the corresponding network interface card in the computer. Together they handle all the hardware details of physically interfacing with the network media being used, e.g. Ethernet cable, etc.

The network layer 314 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 312 provides an interface between the network layer 314 and the application layer 310 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. In the TCP/IP protocol suite there are two distinctly different transport protocols: TCP (Transmission Control Protocol) and UDP (User Datagram Protocol). TCP provides reliability services to ensure that data is properly transmitted between two hosts, including dropout detection and retransmission services. Conversely, UDP provides a much simpler service to the application layer by merely sends packets of data called datagrams from one host to the other, without providing any mechanism for guaranteeing that the data is properly transferred. When using UDP, the application layer must perform the reliability functionality.

The application layer 310 handles the details of the particular application. There are many common TCP/IP applications that almost every implementation provides, including (1) Telnet for remote login; (2) FTP, the File Transfer Protocol; (3) SMTP, the Simple Mail Transfer protocol, for electronic mail, and (4) SNMP, the Simple Network Management Protocol.

Figure 4:
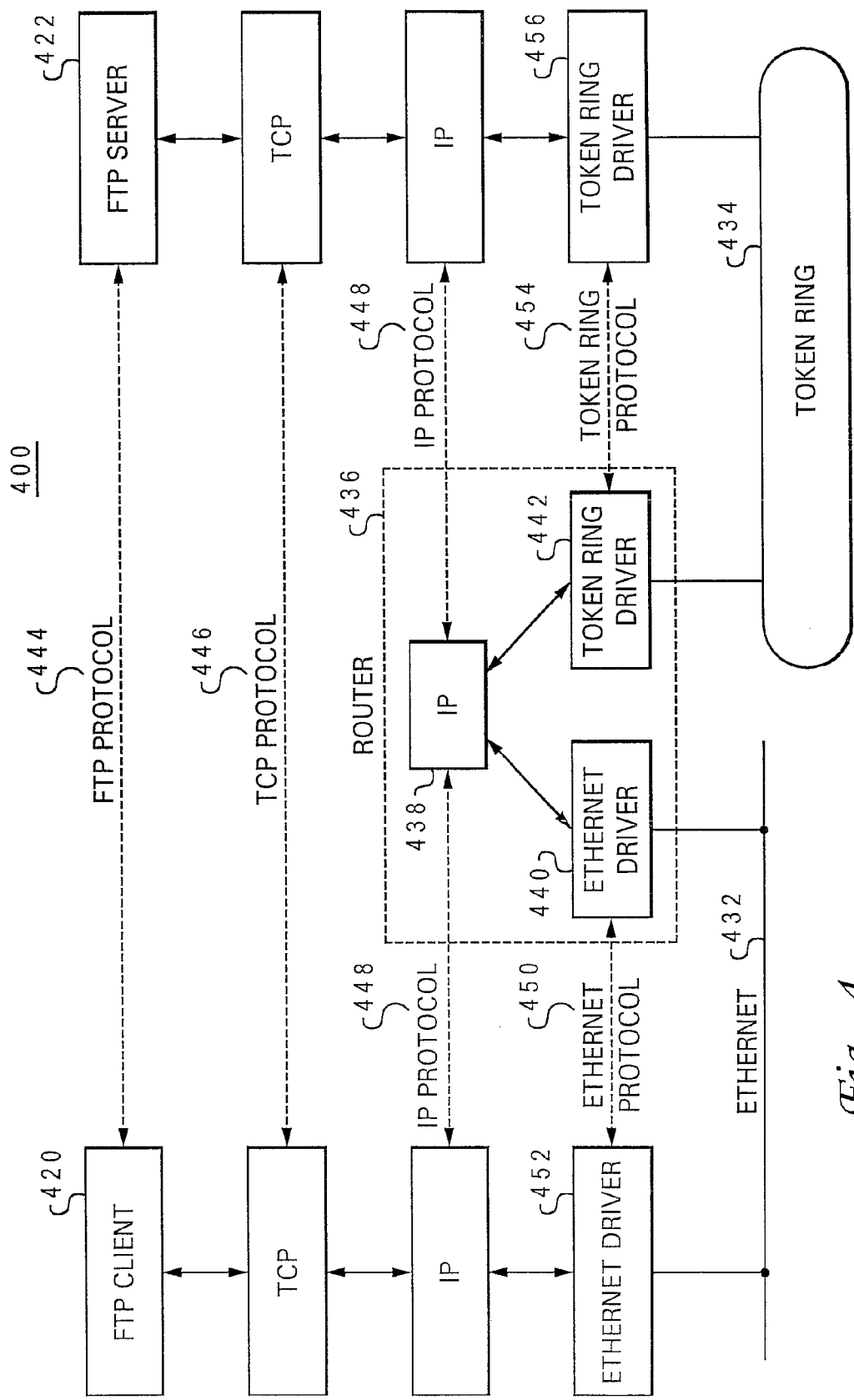
FIG. 4 shows an example of an internet comprising an Ethernet network connected to a token ring network by a router.

Networks such as the Internet are interconnected by routers, which each connect two or more networks together. Typical routers comprise a special-purpose hardware box with input and output connections and dedicated hardware and/or embedded software that allow many different types of physical networks to be connected, such as Ethernet, token ring, point-to-point links, etc. FIG. 4 shows an internet 400 comprising an Ethernet network 432 connected to a token ring network 434 by a router 436. Although FIG. 4 only shows two hosts in communication, any host on the Ethernet network can communicate with any host thereon, or with any host on the token ring network, and vice versa.

As shown in FIG. 4, the router 436 comprises a network layer module 438 (an IP module in this case), and appropriate network drivers for connecting to the host networks, namely an Ethernet driver 440 and a token ring driver 442. At the application layer, the network comprises an FTP client 420 and an FTP server 422. Most network applications are designed so that one end is the client and the other side is the server. The server provides some type of services to various clients, in this case, access to files on the server host. Each layer has one or more protocols for communicating with its peer at the same layer. These communication protocols include the FTP protocol 444 at the application layer, the TCP protocol 446 at the transport layer, the IP protocol 448 at the network layer, and the Ethernet protocol 450 and token ring protocol 454 at the link layer. It is common for the application layer to handle user processes, while the lower three layers (transport, network and link) are implemented in the kernel of the operating system, such as UNIX or Windows operating system. For example, the purpose of the network interface layer is to handle the details of the communication media (Ethernet, token ring, etc.), while the purpose of the application layer is to handle one specific user application (FTP, Telnet, etc.).

The application layer and the transport layer use end-to-end protocols (FTP protocol 444, TCP protocol 446). The network layer provides a hop-to-hop protocol that is used on the two end systems and every intermediate system in between (for clarity only one intermediate system is shown here). For instance, the IP module 438 of the router 436 is connected to the two hosts by IP protocols 448. There are also link layer protocols that are specific to the various types of host networks that are connected to the router to handle communication between the networks and the router at the link layer. Thus, an Ethernet protocol 450 is used to handle communications between the Ethernet driver 440 in the router 436 and the Ethernet driver 452 of the hosts on the Ethernet network 432, while a token ring protocol 454 is used to handle communications between the token ring driver 442 of the router 436 and the token ring driver 456 of the hosts on the token ring network 434.

In the TCP/IP protocol suite the network layer, IP, provides an unreliable service. It moves a packet of data from a source to a destination, but it provides no mechanism for guaranteeing delivery, or even being able to determine if a proper transfer has occurred. TCP provides reliability services to ensure that data is properly transmitted between two hosts, including dropout detection and retransmission services.

A router has two or more network interface layers (since it connects two or more networks). Any system with multiple interfaces is called multi-homed. A host can also be multi-homed, but unless it specifically forwards packets from one interface to another, it is not called a router. Also, routers need not be special hardware boxes that only move packets around an internet. Most TCP/IP implementations allow a multi-homed host to act as a router, but the host needs to be specifically configured to support this use. In such instances, the system is either a host (when an application such as FTP or Telnet is being used) or a router (when it's forwarding packets from one network to another). Another way to connect networks is with a bridge. Bridges connect networks at the link layer, while routers connect networks at the network layer. Bridges make multiple LANs appear to the upper layers as a single LAN.

Figure 5:
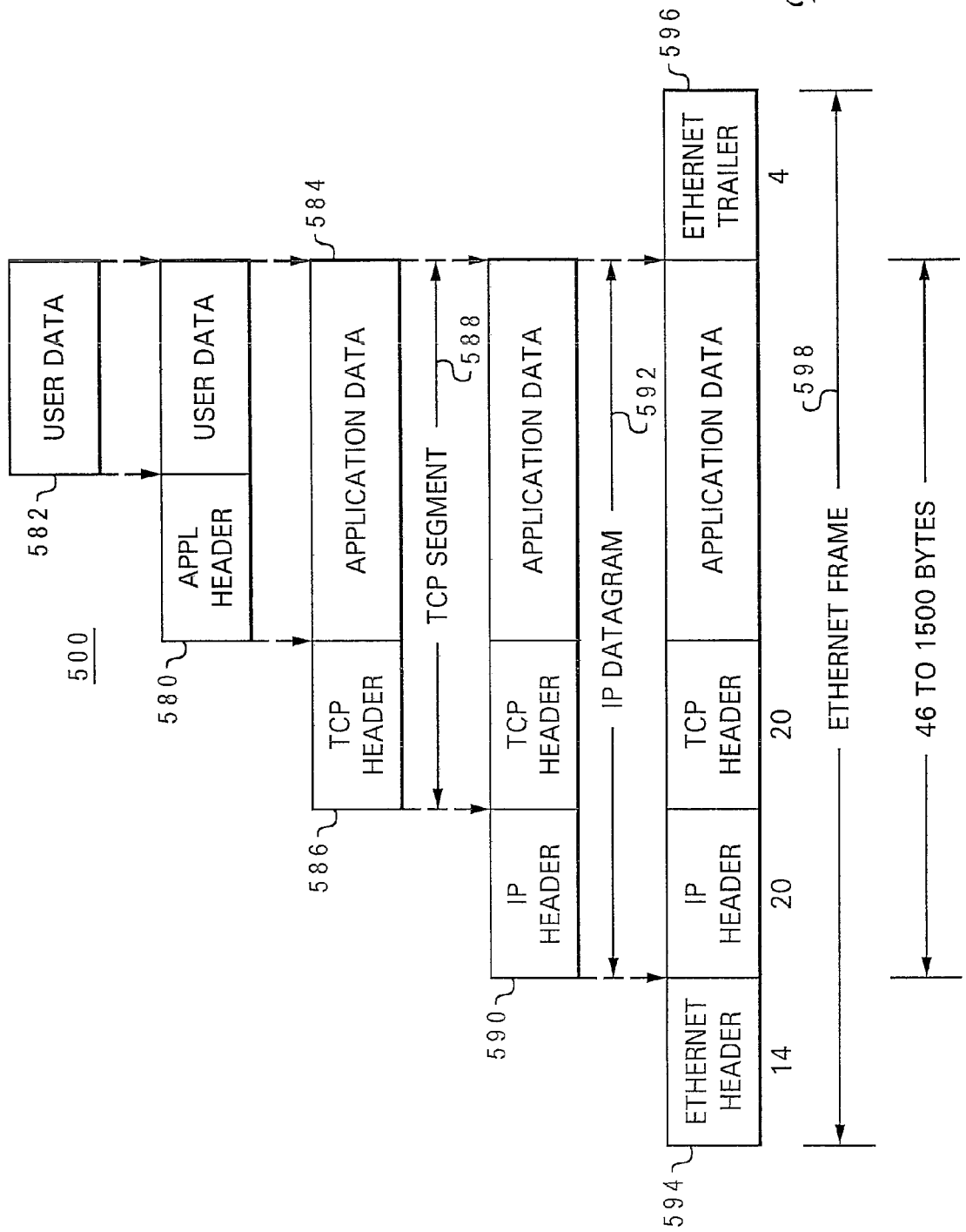
FIG. 5 shows the format of data as it traverses the TCP/IP protocol stack.

When an application sends data using TCP/IP, the data is sent down a protocol stack, through each layer, until it is sent as a stream of bits across the network. As shown in FIG. 5, each layer adds information to the data by prepending headers (and sometimes adding trailer information) to the data that it receives. For instance, at the application layer an application header 580 is prepended to user data 582 to form application data 584. At the transport layer a transport protocol header is prepended to the application data. In the case of FIG. 5 the transport layer is TCP, and therefore a TCP header 586 is prepended to the application data 584, thereby forming a TCP frame 588 that is sent to the network layer IP. The TCP header 586 comprises twenty bytes. Similarly, at the network layer, a network layer header is prepended to the transport layer data. In the case of TCP/IP, an IP header 590 is prepended to the TCP frame 588 to form an IP datagram 592. The IP header 590 also comprises twenty bytes. Finally, at the link layer a media header such as Ethernet header 594 is added to the data received from the network layer to form a frame of data. In some instances, such as when the media is Ethernet, a media trailer is also appended to the end of the data. For instance, in FIG. 5 an Ethernet trailer 96 is appended to the Ethernet Header 594 and the IP datagram 592 to form an Ethernet frame 598. The Ethernet frame comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc. The size of the frame will be limited by the maximum transmission unit (MTU) of the type of network being used to transfer the data packet. For example, the MTU of an Ethernet network is 1500 bytes. The network layer automatically performs fragmentation (breaking the datagram up into smaller pieces), so that each fragment is smaller than the MTU of the network.

Figure 6:
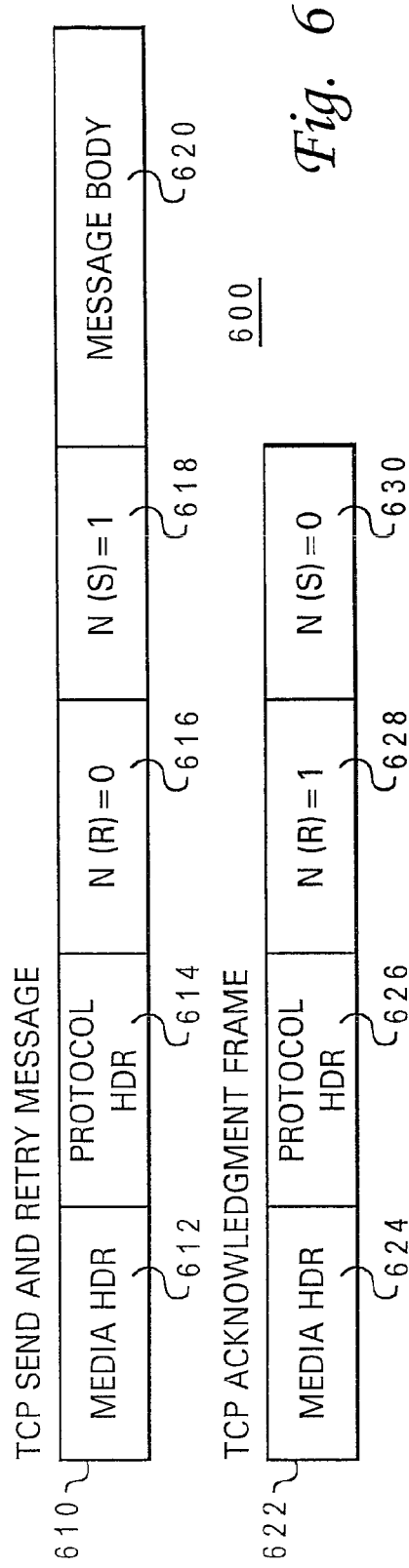
FIG. 6 shows the data structure of a TCP send or retry frame and a TCP acknowledge frame.

When the client detects that certain data frames are missing from the data transmission stream, the client will request that the server retransmit the missing frame by sending the sequence number of the first byte of the missing frame in the acknowledge frame. As seen in FIG. 6, the TCP send or retry message 610 typically comprises a media header 612, a protocol header 614, a received sequence number field 616, a send sequence number field 618, and a message body 620. The media header 612 will be particular to the type of network, e.g., an Ethernet header for an Ethernet network, etc. The protocol header 614 will depend on the transport and network layer protocol used, such as TCP/IP, IPX/SPX, Netbios, etc. The received sequence number field 616 provides an identifier to the last sequence number reliably received by the computer. The send sequence number 618 corresponds to the relative sequential number of the message. The message body 620 contains the application data that is being sent between the source and destination computers. The TCP acknowledge frame 622 comprises a media header 624, a protocol header 626, a received sequence number field 628, and a send sequence number field 630. These fields are analogous to the fields described above which share the same name. The acknowledge frame 622 is sent by the receiving computer to acknowledge receipt of a send or retry message. In accordance with TCP, upon receiving three consecutive acknowledge frames indicating a missing frame, the server would normally "fast retransmit" the missing frame starting with the sequence number that is missing. Such re-transmissions negatively impact performance as the server cuts back on its sliding window and reduces the amount of data it sends.

Figure 7:
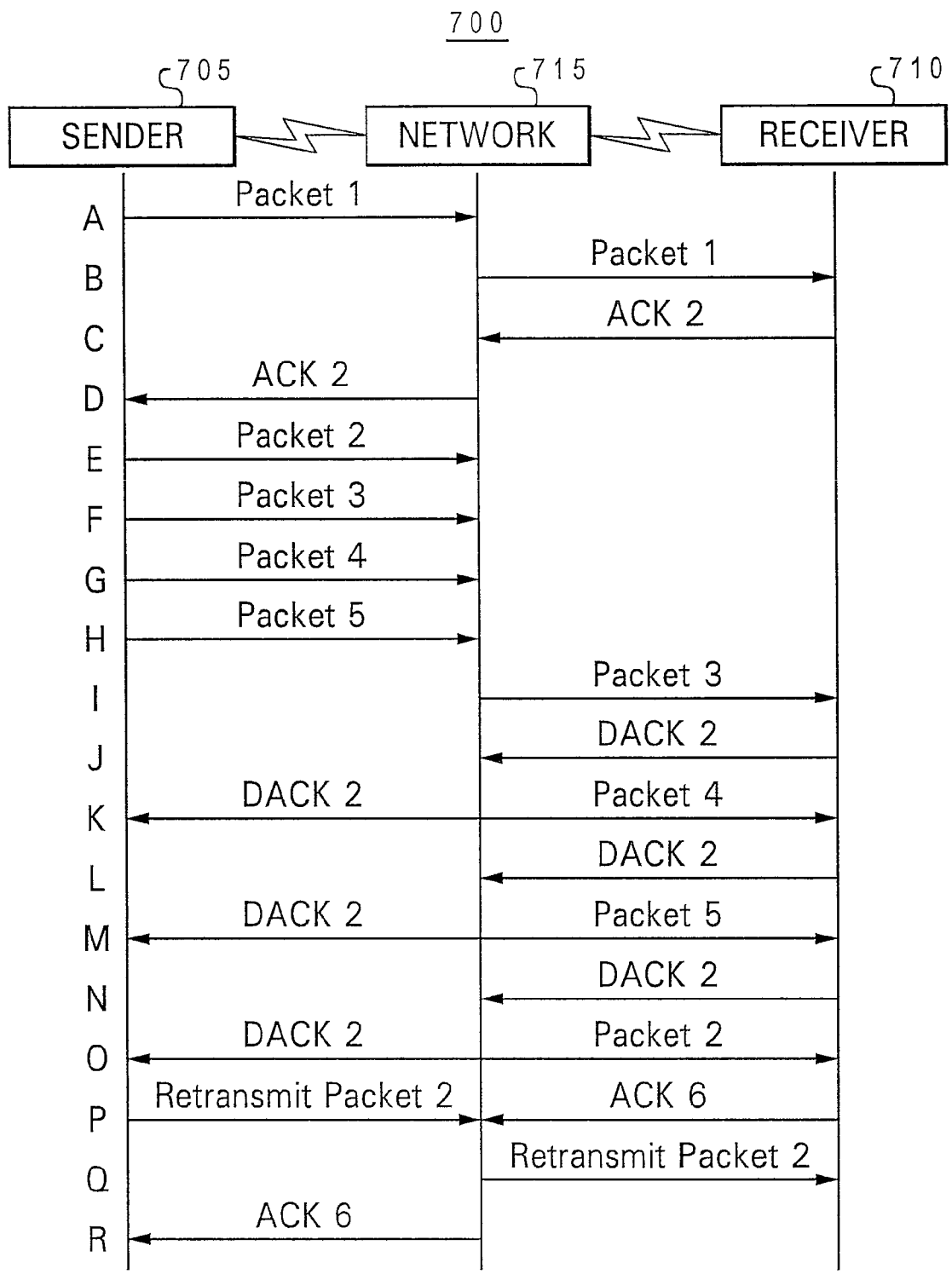
FIG. 7 shows a timing diagram for an example of the improved TCP performance provided by a preferred embodiment of the present invention.

With reference now to FIG. 7, there is shown a timing diagram for an example of the improved TCP performance provided by a preferred embodiment of the present invention. The example illustrated in FIG. 7 shows a timing diagram 700 of a Sender 705 transmitting five data packets to a Receiver 710 over a Network 715. At time A, Packet 1 is sent to the Network 715. At time B, Packet 1 is transferred from the Network 715 to the Receiver 710. At time C, the Receiver 710 acknowledges receipt of Packet 1 and requests Packet 2 (ACK 2). At time D, ACK 2 is transferred from the Network 715 to the Sender 705.

At times E, F, G and H, the Sender 705 transmits Packets 2, 3, 4 and 5, respectively, to the Network 715. However, the Network 715 reorders the received packets from the Sender 705 and first transmits Packet 3 to the Receiver 710, as seen at time I. In response to receiving Packet 3, the Receiver 710 transmits a duplicate ACK 2 (DACK 2) at time J, indicating that the Receiver 710 has not yet received Packet 2 and that Packet 3 was received out of order. At time K, the DACK 2 is transmitted from the Network 715 to the Sender 705. Also, at time K, the Network 715 transmits Packet 4 to the Receiver 710. In response, the Receiver 710 transmits a second DACK 2 at time L, indicating that Packet 4 has been received out of order and requesting Packet 2. At time M, this second DACK 2 is passed from the Network 715 to the Sender 705, and Packet 5 is passed from the Network 715 to the Receiver 710. At time N, the Receiver 710 responds to receipt of Packet 5 by again, retransmitting a third DACK 2, acknowledging receipt of Packet 5 and again requesting Packet 2. At time O, this third DACK 2 is received at the Sender 705 from the Network 715.

Also, at time O, the Receiver 710 finally receives Packet 2 from the Network 715. At time P, the Sender 705 "Fast Retransmits" Packet 2 upon receiving the third DACK 2, as is specified by the TCP protocol. Because the TCP considers the receipt of the third DACK a result of congestion on Network 715, the Sender 705 reduces the congestion window by 50 percent upon retransmitting Packet 2. Also at time P, the Receiver 710 has now received Packets 2, 3, 4 and 5, and responds with an ACK requesting Packet 6. As a result of the reordering of packets in the Network 715, ACK 6 and the retransmitted Packet 2 are both present in the Network 715 at the same time. (It will be appreciated that this timing is merely representative of an example, and that other timing may occur in the process. The only timing requirement for proper operation of the method of the present invention is for the ACK 6 to be transmitted from the Receiver 710 prior to the Receiver 710 receiving the retransmitted Packet 2.) At time Q, Receiver 710 receives the retransmitted Packet 2 from the Network 715. At time R, the Sender 705 receives the ACK 6 from the Network 715.

At this point, it is ambiguous whether the ACK 6 received at time R after the retransmission of the Packet was in response to the original transmission or the retransmission of the Packet 2. In the prior art, the ACK is assumed to be a result of the Receiver 710 receiving the retransmitted Packet 2, so, in accordance with TCP, the Sender 705 continues to operate with the reduced congestion window. However, the preferred embodiment of the present invention provides the Sender 705 a method for differentiating between an ACK received as a result of an actual packet loss event and an ACK received as a result of packet reordering. If the Sender 705 determines in accordance with the preferred embodiment that the Fast Retransmission occurred as a result of reordering, then congestion control and avoidance are not performed, thereby eliminating the needless restriction on TCP bandwidth.

The preferred embodiment of the present invention is a process beginning when Sender 705 saves the current congestion state as the variable CCS, representing SSThresh and cwnd, prior to retransmitting a packet by "Fast Retransmit" and reducing the congestion window. Upon receiving the subsequent ACK that acknowledges the retransmitted packet (ACK 6 in the example of FIG. 7), the TCP Sender 705 determines if the ACK resulted from receipt of the original reordered packet or the retransmitted packet, based on the arrival time of the ACK at the Sender 705. If the ACK arrives prior to the expiration of a calculated time threshold for the round-trip-time of the retransmitted packet (THRESH-RTT), the Sender 705 assumes that reordering in the Network 715 has occurred, in contrast to packet loss. In this case, the CCS is used to restore the congestion state back to the saved values, thereby permitting the system to continue operating at its original increased throughput because the retransmission did not occur as a result of network congestion.

To calculate the threshold retransmit RTT (THRESH-RTT), the TCP Sender 705 stores the time that a packet is retransmitted (Tretransmitted). On arrival of a retransmission acknowledgment, the Sender 705 computes the RTT by storing the time when the acknowledgment arrives (Tcurrent) and then calculating the difference between the retransmission and arrival times (i.e., Tcurrent−Tretransmitted). If the difference is much lower than the average or current calculated round-trip-time (RTT) for the link between sender and receiver, then there is a strong indication that the retransmission occurred as a result of a reordering event. The following equation describes this calculation in a preferred embodiment:

$$(Tcurrent - Tretransmitted) < alpha * RTT$$

where "alpha" is a number between 0 and 1 and is a factor for estimating the minimum possible RTT between sender and receiver and that compensates for variations in RTT and an unrelated sudden drop RTT in the network. In preferred embodiments, alpha is set within a range of 0.5 and 0.75 (i.e. 50-75 percent), and preferably at 0.6. Upon detecting a reordering event based on the above calculation being confirmed, the sender will restore the congestion state back to the system values prior to performing the fast retransmit (i.e., back to the stored values for CCS. As will be appreciated, the mechanism of the preferred embodiment is implemented in the sender side and requires no change to the receiver side logic. This ensures that this technique will work with all existing and future TCP implementations that do not implement this performance enhancement.

As will be appreciated, in one preferred embodiment, congestion avoidance is implemented upon retransmission of the packet and is reverted back to the original CCS upon receipt of an early ACK indicating reordering of packets. In another preferred embodiment, implementation of congestion avoidance is delayed following a Fast Retransmission until after a timely response ACK to the retransmission is received, confirming that network congestion caused a packet loss.

Figure 8:
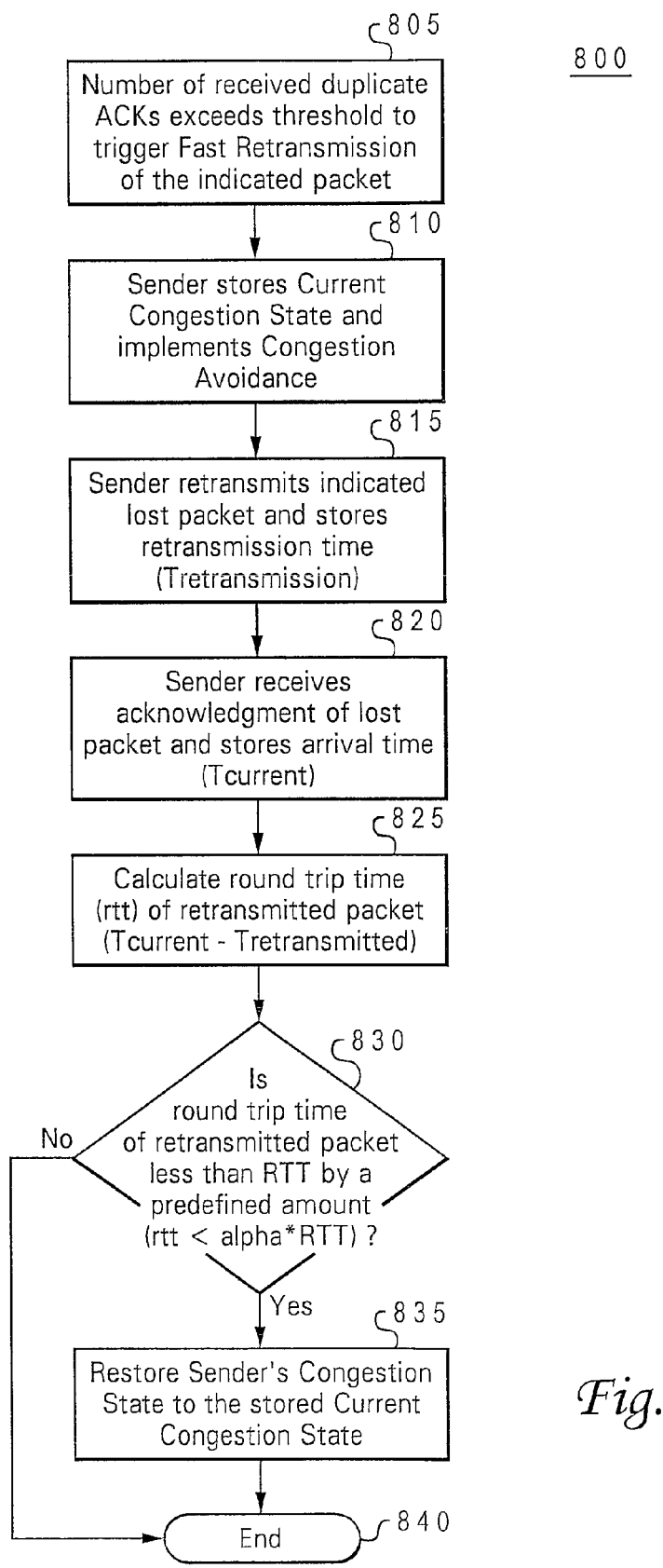
FIG. 8 shows a flow diagram of the process for improved TCP performance following packet reordering, in accordance with a preferred embodiment of the present invention.

With reference now to FIG. 8, there is shown a flow diagram of the process for improved TCP performance following packet reordering, in accordance with a preferred embodiment of the present invention. The process 800 begins at step 805 when the number of received duplicate acknowledgments at the Sender 705 exceeds the threshold number in the transport protocol to trigger a Fast Retransmission and Recovery (FRR) of the indicated packet. In the TCP protocol, FRR typically occurs when the Sender 705 receives 3 DACKs. Thereafter, the process passes to step 810, where the Sender 705 stores the Current Congestion State (CSS), which includes the congestion window and slow start threshold, and implements Congestion Avoidance by reducing the slow start threshold (SSThresh) to half its current value. The process then passes to step 815, where the Sender 705 retransmits the indicated lost packet and stores the time at which the retransmission occurs under the variable Tretranmission. The process then passes to step 820, at which point the Sender 705 receives an acknowledgment of the packet that had been retransmitted and stores the arrival time of this acknowledgment as the variable Tcurrent. Thereafter, the process passes to step 825, where a round-trip-time (rrt) for the retransmitted packet is calculated by determining the difference between the time of the retransmission and the packet's acknowledgment arrival time. The process then passes to decision block 830, where it is determined if the round-trip-time of the retransmitted packet is less, by a predefined amount, than the minimum-expected round-trip-time for the route between Sender 705 and Receiver 710, wherein the predefined amount is a function of the characteristics of the link and a theoretically possible sudden drop in RTT in the Network 715. This predefined amount is implemented with a scaling factor represented by "alpha" and is set between 0 and 1, preferably in the range of 0.5-0.75. Thus, the determination at step 830 can be represented by the equation: $rrt < alpha * RTT$. If the determination at step 830 is negative, the process passes to step 840, where it ends because it has been determined that congestion avoidance was properly implemented in response to a lost packet. If the determination at step 830 is affirmative, the process passes to step 835, where the congestion state in the Sender 705 is restored to the CCS stored at step 810, and thereafter the process ends at step 840.

It will be appreciated that the Congestion State is returned the CCS, which existing prior to the Sender 705 initiating the Fast Retransmission, because the round-trip-time calculated at step 825 indicated that the acknowledgment was received in response to the rerouted original packet arriving at the Receiver 710, and not in response to receipt of the retransmitted packet. Therefore, in accordance with the preferred embodiment, the erroneous trigger of congestion avoidance resulting from the reordering of transmitted packets is reversed by re-instating the congestion state to CCS, thereby boosting performance by increasing throughput that would have been otherwise throttled by implementation of TCP congestion avoidance.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. A method for practicing the invention may result from combining one or more machine-readable storage devices containing the code with appropriate standard computer hardware to execute the code. An apparatus for practicing the invention could be one or more computers and storage systems containing or having network access to computer program(s) coded in accordance with the invention.

The invention claimed is:

1. A data processing system providing improved transport layer performance following packet reordering in a network, said system comprising:
   means, responsive to receiving at least one first acknowledgement requesting a data packet be retransmitted, for retransmitting the requested data packet over the network connection from the sender to the receiver;
   means for receiving a second acknowledgement indicating that the requested data packet has been received by the receiver;
   means for calculating the difference between the time that the second acknowledgement was received and the time that the requested data packet was retransmitted;
   means for operating the network connection in the first congestion state, if the difference is less than a threshold round-trip-time, wherein the threshold round-trip-time is a minimum round-trip-time for a data packet over the network connection between the sender and the receiver; and
   means for operating the network connection in a second congestion state, if the difference is greater than the threshold round-trip-time, wherein the second congestion state is less than the first congestion state, wherein the network comprises a network connection between a sender and a receiver.

2. The data processing system according to claim 1, further comprising means for operating the network connection in a third congestion state upon retransmitting the requested data packet.

3. The data processing system according to claim 2, further comprising means for storing the first congestion state prior to retransmitting the requested data packet.

4. The data processing system according to claim 2, wherein the third congestion state less than the first congestion state.

5. The data processing system according to claim 1, wherein the first and second congestion states comprise congestion windows.

6. The data processing system according to claim 1, wherein the first and second congestion stats comprise slow start thresholds.

7. The data processing system according to claim 1, further comprising means for storing the time that the requested data packet is retransmitted.

8. The data processing system according to claim 1, wherein the network connection operates in conformance with the TCP protocol.

9. The data processing system according to claim 1, wherein the requested data packet is sent by the data processing system and the acknowledgements are sent from a client over the Internet.

10. The system of claim 1, wherein the means for retransmitting the requested data packet are responsive to receiving a predetermined threshold number of first acknowledgements.

11. The system of claim 1, further comprising means, responsive to receiving said at least one first acknowledgement, for storing the first congestion state prior to reducing a congestion window.

12. An article of manufacture for improved transport layer performance following packet reordering in a network, wherein the network comprises a network connection between a sender and a receiver and wherein the network connection operates in a congestion state, comprising tangible machine-readable medium including program logic embedded therein that causes control circuitry in a data processing system to perform the steps of:
   in response to receiving at least one first acknowledgement requesting a data packet be retransmitted over the network connection operating in a first congestion state, retransmitting the requested data packet over the network connection from the sender to the receiver;
   receiving a second acknowledgement indicating that the requested data packet has been received by the receiver;
   calculating the difference between the time that the second acknowledgement was received and the time that the requested data packet was retransmitted;
   setting the congestion state of the network connection to the first congestion state, if the difference is less than a threshold round-trip-time, wherein the threshold round-trip-time is a minimum round-trip-time for a data packet over the network connection between the sender and the receiver; and
   setting the congestion state of the network connection to a second congestion state, if the difference is greater than the threshold round-trip-time, wherein the second congestion state is less than the first congestion state.

13. The article of manufacture of claim 12, further comprising the step of setting the congestion state to a third congestion state upon retransmitting the requested data packet.

14. The article of manufacture of claim 13, further comprising the step of storing the first congestion state prior to retransmitting the requested data packet.

15. The article of manufacture of claim 13, wherein the third congestion state less than the first congestion state.

16. The article of manufacture of claim 12, wherein the first and second congestion states comprise congestion windows.

17. The article of manufacture of claim 12, wherein the first and second congestion states comprise slow start thresholds.

18. The article of manufacture of claim 12, wherein the program logic causes the control circuitry to perform the step of storing the time that the requested data packet is retransmitted.

19. The article of manufacture of claim 12, wherein the network connection operates in conformance with the TCP protocol.

20. The article of manufacture of claim 12, wherein threshold round-trip-time is between 50 percent and 75 percent of an average round-trip-time for the network connection.

21. The article of manufacture of claim 12, wherein the requested data packet is retransmitted in response to receiving a predetermined threshold number of first acknowledgements.

22. The article of manufacture of claim 12, wherein the program logic causes the control circuitry to perform the step of, in response to receiving said at least one first acknowledgement, storing the first congestion state prior to reducing a congestion window.

* * * * *